United States Patent [19]
Koizumi et al.

[11] Patent Number: 4,809,098
[45] Date of Patent: Feb. 28, 1989

[54] TAPE CASSETTE LOADING DEVICE

[75] Inventors: Satoru Koizumi; Daisuke Teshima; Yoshio Katayama, all of HigashiHiroshima, Japan

[73] Assignee: Sharp Kabushiki Kaisha, Osaka, Japan

[21] Appl. No.: 846,956

[22] Filed: Apr. 1, 1986

[30] Foreign Application Priority Data

Apr. 25, 1985 [JP] Japan .................. 60-62930[U]

[51] Int. Cl.$^4$ ............................................ G11B 15/68
[52] U.S. Cl. ...................................... 360/92; 360/96.5
[58] Field of Search ...................... 360/96.5, 92, 85; 242/197-200

[56] References Cited

U.S. PATENT DOCUMENTS 3,996,618 12/1976 Suzuki .......................... 360/96.5
4,071,860  1/1978 Watanabe ..................... 360/96.5

FOREIGN PATENT DOCUMENTS 2802255  8/1978 Fed. Rep. of Germany.

*Primary Examiner*—A. J. Heinz
*Attorney, Agent, or Firm*—Birch, Stewart, Kolasch & Birch

[57] ABSTRACT

A tape cassette loading device inclusive of a tape cassette holder which is slidably or rotatably stored in or drawn out of a main body of a tape cassette apparatus includes a tape cassette holder for storing at least one tape cassette and for slidably or rotatably moving the at least one tape cassette from or to a predetermined position within a holder storing member provided with the main body of the apparatus, support members slidably or swingly provided with the cassette holder and supporting members with the holder storing member, for supporting the at least one cassette, and positioning members provided, for positioning the at least one tape cassette at the predetermined position via the supporting members.

9 Claims, 5 Drawing Sheets

TAPE CASSETTE LOADING DEVICE

BACKGROUND OF THE INVENTION

The present invention relates to a tape cassette loading device for a magnetic recording and/or reproducing apparatus such a a tape recorder.

Various types of magnetic recording/reproducing apparatuses which can simultaneously drive a plurality of tape cassettes have been developed to simplify all operations, especially editing. To achieve a compact apparatus and keep the cost of the apparatus low, a plurality of tape cassettes are loaded onto a single capstan and a pair of reel axes, and stored in the apparatus. In this case, a tape cassette loading device is provided for storing the plurality of tape cassettes such that the plurality of tape cassettes are layered on each other. However, the tape cassette loading device must be moved to place the tape cassettes at a predetermined position such as a driving position after inserting the tape cassettes. In the conventional tape cassette loading device, the positioning of the tape cassettes at the driving position are not accurately carried out. Therefore, the tape cassettes inaccurately positioned may be poorly operated, and the purpose of the selected operation may not be achieved.

SUMMARY OF THE INVENTION

Accordingly, it is an object of the present invention to provide an improved tape cassette loading device which can store a plurality of tape cassettes and which can accurately position each of the tape cassettes at a predetermined position.

It is another object of the present invention to provide a tape cassette recorder including a tape cassette loading device which can store a plurality of tape cassettes and accurately position each of the tape cassettes.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a tape cassette loading device which is slidably or rotatably stored in or drawn out of a main body of an apparatus comprises a cassette holder for holding a tape cassette(s) and for slidably or rotatably moving the a tape cassette(s) from or to a predetermined position within a holder storing member provided with a main body of a tape cassette recorder, supporting members provided with the cassette holder, and support members provided with the holder storing member for supporting the cassette(s), and positioning means provided with the holder storing member of the main body, for positioning the tape cassette(s) at the predetermined position via the support member of the cassette holder.

The tape cassette support member may be slidably provided with one cassette holder. When the cassette holder is stored in the main body of the apparatus, the end of the tape cassette support member is in contact with the tape cassette and the other end of the support member is in contact with the positioning means on the back wall of the holder storing member.

In the case when more than one tape cassette is stored in the cassette holder and loaded onto a single capstan, the positioning means and the support member are used for the tape cassettes except the tape cassette nearest to the bearing portion of the single capstan.

In the case when first and second tape cassettes are stored in the cassette holder, the tape cassette loading device comprises positioning means for positioning the first tape cassette in a vertical direction and in a horizontal direction, means for positioning the second cassette in the vertical direction, and positioning means and support member are provided for positioning the second tape cassette in the horizontal direction. The first tape cassette is loaded near to the bearing portion of the capstan. The means for positioning the first tape cassette in the horizontal and the vertical directions and the means for positioning the second tape cassette in the vertical direction are provided with the main body of the apparatus.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
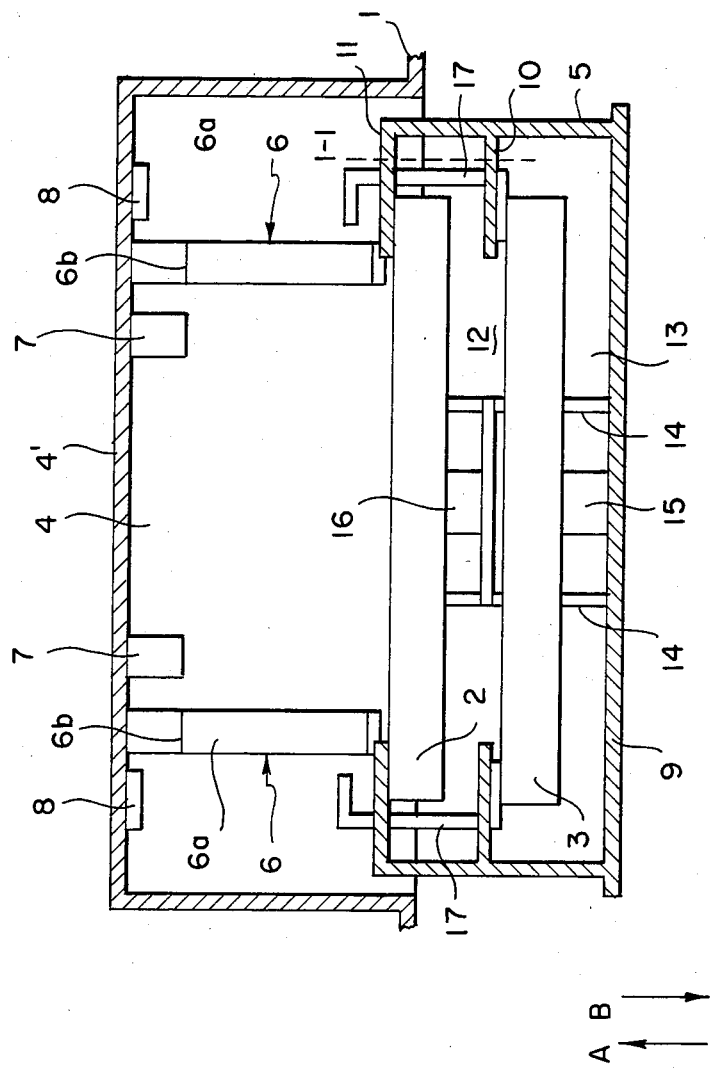
FIG. 1 shows a horizontally sectional view of a tape cassette loading device according to an embodiment of the present invention wherein a tape cassette holder is drawn out of a holder storing member.

An embodiment of the present invention will be described with reference to FIGS. 1 through 5. In the embodiment, a double cassette tape recorder of a coaxial construction type is used. A plurality of tape cassettes are loaded onto a single capstan and a pair of real axes (not shown). However, the number of the tape cassettes should not be limited to two, and may be more than two.

A tape cassette loading device comprises a tape cassette holder 5 for coaxially storing a plurality of tape cassettes (in the embodiment shown, first and second tape cassettes 2 and 3) and a holder storing member 4 provided with the main body of a tape cassette recorder for storing the tape cassette holder 5. The first tape cassette 2 is loaded near the bearing portion of the capstan and the real axes, and the second tape cassette 3 is separated from the bearing portion of the capstan and the real axes.

Figure 7:
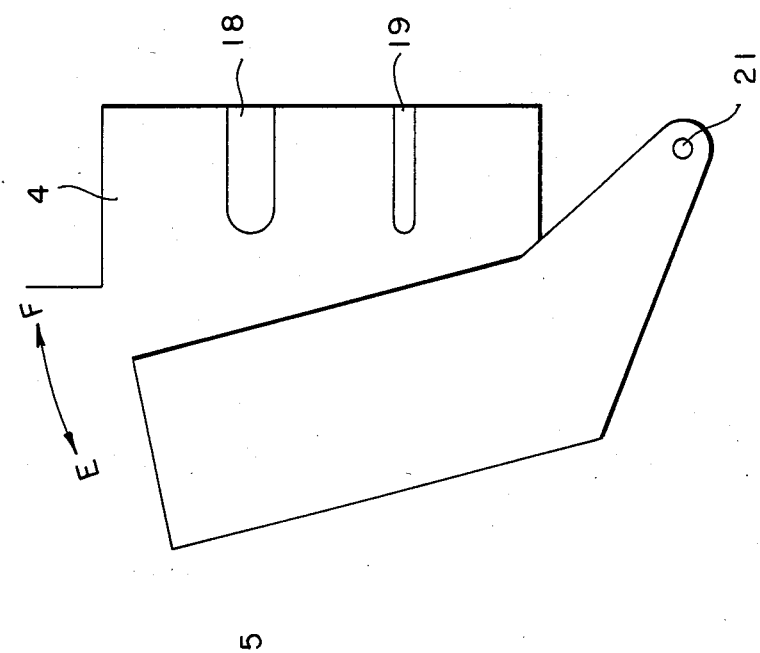
FIG. 7 shows a sectional view of a tape cassette loading device according to another embodiment of the present invention.
Figure 6:
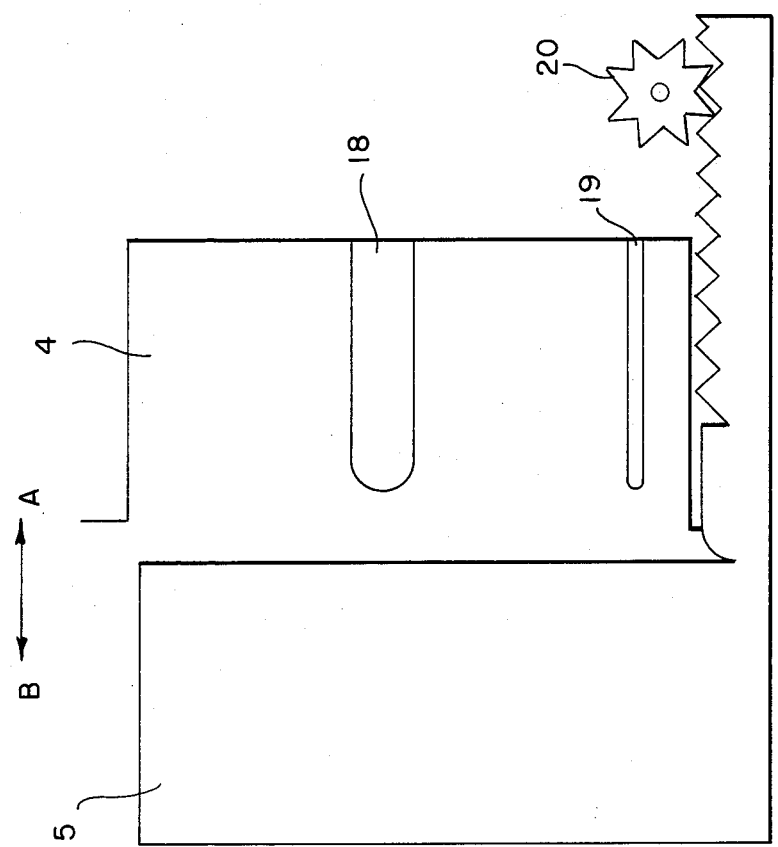
FIG. 6 shows a sectional view of the tape cassette loading device of FIG. 1.

The tape cassette holder 5 is connected to the holder storing member 4 so that the tape cassette holder 5 is slidably stored in the holder storing member 4 and slidably drawn out of the holder storing member 4. When the tape cassette or the tape cassettes are inserted by the user, the tape cassette holder 5 is drawn out of the holder storing member 4. When the tape cassette or the tape cassettes are driven, the tape cassette holder 5 is inserted and stored in the holder storing member 4. The tape cassette holder 5 may be slidably moved by a motor mechanism 20 as shown in FIG. 6. When the tape cassette holder 5 is in the condition of FIG. 2 and slightly pushed in the direction of arrow B, the tape cassette holder 5 is drawn out of the holder storing member 4 by the motor mechanism 20 in response to the pressing operation. When the tape cassette holder 5 is in the condition of FIG. 3 and slightly pushed in the direction A, the tape cassette holder 5 is stored in the holder storing member 4 by the motor mechanism 20 in response to the pressing operation. The tape cassette holder 5 may be rotatably provided as shown in FIG. 7. The tape cassette holder 5 is rotatably moved about an axis 21 in the directions of arrows E and F. A capstan 19, and real axis 18 are represented in FIGS. 6 and 7.

Figure 2:
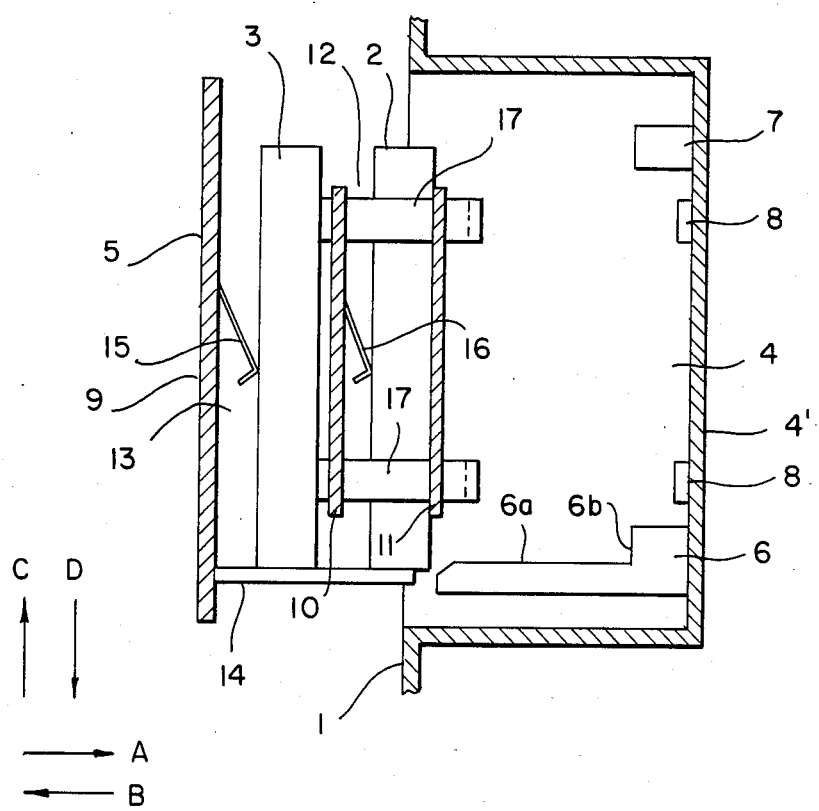
FIG. 2 shows a vertical sectional view of a tape cassette loading device according to an embodiment of the present invention wherein the tape cassette holder is drawn out of the holder storing member.
Figure 3:
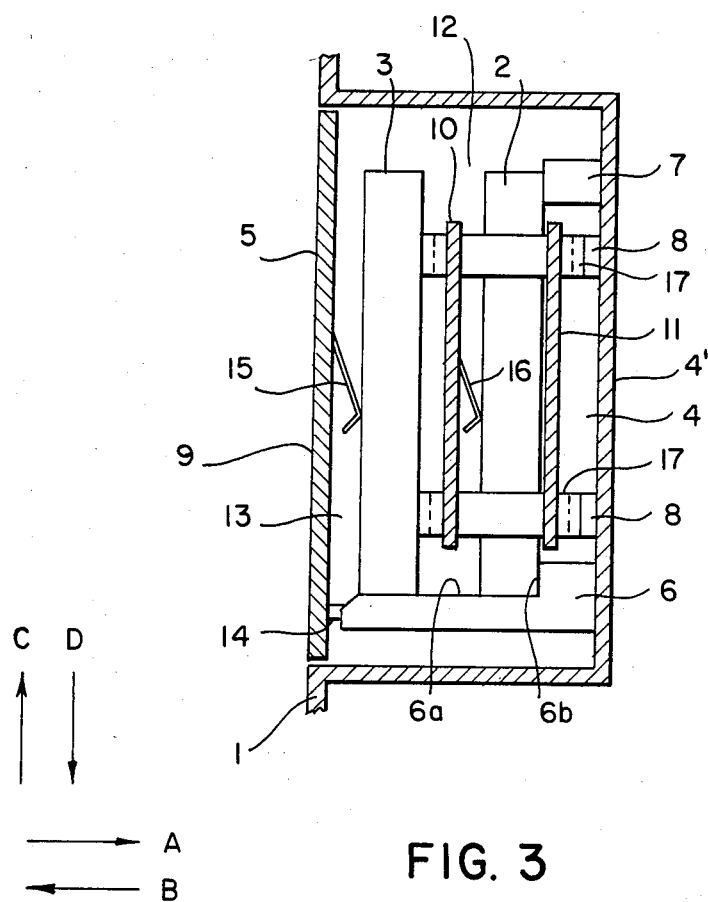
FIG. 3 shows a vertical sectional view of a tape cassette loading device according to an embodiment of the present invention wherein the tape cassette holder is stored in the holder storing member.
Figure 4:
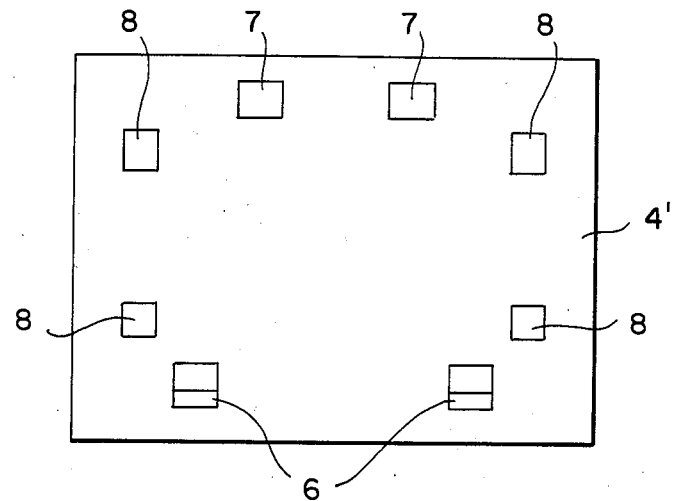
FIG. 4 shows a plan view of a back wall of a holder storing member.
Figure 5:
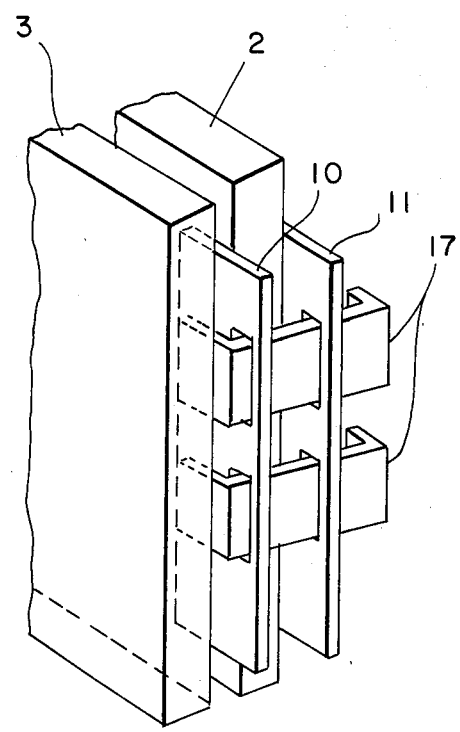
FIG. 5 shows a perspective view of supporting members and partition plates taken along a line I—I of FIG. 1.

The holder storing member 4 has a back wall 4' opposite to the tape cassette holder 5 and comprises tape cassette support members 6, each including a flat portion 6a for positioning the first and second tape cassettes 2 and 3 in the upper and lower or vertical direction (see FIG. 2, arrow directions C and D) and a step portion 6b for positioning the first tape cassette 2 in the front and back or horizontal direction (See FIG. 2, arrow directions A and B), first positioning members 7 for positioning the first tape cassette 2 in the front and back or horizontal direction (See FIG. 2, the arrow directions A and B), and second positioning members 8 for positioning the second tape cassette 3 in the front and back or horizontal direction (See FIG. 2, the arrow direcions A and B). As shown in FIG. 4, the two cassette supporting members 6 are provided at the lower portion of the back wall 4', in parallel. The two first positioning members 7 are provided at the upper portion of the back wall 4', in parallel. Two pair of the second positioning members 8 are provided at the lower and upper portions of the back wall 4', in parallel, respectively. Corresponding or opposite second positioning members 8 at the lower portion and upper portion provided in parallel. The number of each of the members 6, 7, 8 need not be limited to the number in FIG. 5. Furthermore, the positioning of each of the members 6, 7, and 8 may be changed.

The tape cassette holder 5 includes a cover 9 for covering the tape cassettes 2 and 3 and the holder storing member 4, tape cassette carrying members 14 for carrying the tape cassettes 2 and 3 on the tape cassette holder 5, a first support portion or space 12 formed by the partition plates 10 and 11 and a second support portion or space 13 formed by the cover 9 and partition plate 10 for supporting the layered first and second tape cassettes 2 and 3, respectively. The partition plates 10 and 11 are provided projecting from each of the side walls of the cover 9.

Plate springs 15 and 16 are connected to the cover 9 and the partition plate 10, respectively, to stress the tape cassettes 2 and 3 in the direction of arrow B. U-shaped support members 17, each having a first bent end and a second bent end, are slidably provided with partition plates 10 and 11 which slidably move in the directions of arrows A and B, i.e. horizontally. In the embodiment of the present invention, two pairs of U-shaped support members 17 are slidably provided with the two pairs of partition plates 10 and 11 projected from the side walls of the cover 9, respectively. The two pairs of support members 17 are provided at the lower portion and upper portion of the partition plates 10 and 11, respectively. A first bent end of each of the U-shaped support members 17 will contact one of the second positioning members 8, and the second bent end of each of the support members 17 will contact the second tape cassette 3. FIG. 4 shows a perspective view of a partition plates 10 and 11, and support members 17 taken along a line I—I of FIG. 1. Even when the first bent end of the support member 17 is in contact with the partition plate 11, the second tape cassette 3 can be inserted in the second support portion 13.

The operation of the above tape cassette loading device will be described. After the cassette holder 5 is slidably drawn out of the holder storing member 4, the first and second tape cassettes 2 and 3 are stored in the first and second support, portions 12 and 13, respectively. The tape cassettes 2 and 3 are carried on the carrying members 14, and are stressed in the direction of arrow A by the springs 15 and 16 so that the tape cassette 2 is in contact with the partition plate 11 and the second tape cassette 3 is in contact with the second bent ends of the support plates 17. After inserting the first and second tape cassettes 2 and 3, the tape cassette holder 5 is pushed in the direction A and stored in the holder storing member 4.

The first and second tape cassettes 2 and 3 are carried on the flat portions 6a of the cassette supporting members 6. In this time, the positioning of the first and second tape cassettes 2 and 3 in the upper and the lower (vertical) directions (arrow directions C and D) are carried out. The position of the first tape cassette 2 in the front and the back (horizontal) directions (arrow directions A and B) is determined such that the first tape cassette 2 is slightly moved in the direction of arrow B against the force of the spring 16 when the first tape cassette 2 is in contact with the step portions of the supporting members 6 and the first positioning members 7. The position of the second tape cassette 3 in the front and the back (horizontal) directions (arrow directions A and B) is determined such that the second tape cassette 3 is slightly moved in the direction of arrow B when the first bent end of each of the support members 17 is in contact with each of second positioning members 8.

In the tape cassette loading device of the present invention for use in magnetic recording and/or reproducing apparatus, the tape cassette support members are slidably provided with the tape cassette holder. When the tape cassettes are stored in the tape cassette holder and the tape cassette holder reaches the driving position in the magnetic recording and/or reproducing apparatus, each of the support members is in contact with each of the respective positioning means formed on the main body of the apparatus and the at least one tape cassette to carry out the positioning of the plurality of the tape cassettes layered and supported in the tape cassette holder. The positioning of the first tape cassette is carried out by the first positioning members 7 and the supporting members 6, and the positioning of the second tape cassette is carried out by the supporting members 6, the second positioning members 8, and the movable support members 17.

As described above, in the apparatus for driving the plurality of tape cassettes coaxially stored in the tape cassette holder, all tape cassettes are accurately positioned at the driving position. For example, the tape cassette disposed at the most right as shown in FIG. 2 is accurately positioned by a positioning means and the supporting means provided with the main body of the apparatus, and the remaining tape cassettes are accurately positioned by a positioning means provided with the main body of the apparatus and the movable support means provided with the tape casstte holder.

Although the support members 17 are slidably provided with the tape cassette holder 5, the support members 17 may be swingly provided with the tape cassette holder 5.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A tape cassette loading device which can store and accurately position a plurality of tape cassettes in the main body of a tape cassette recorder and/or reproducing apparatus comprising:
    a tape cassette holder storing member portion of a main body of a tape cassette recorder and/or reproducing apparatus having an entrance opening for the introduction of and storing a tape cassette holder;
    a tape cassette holder for storing a plurality of tape cassettes provided with partition plates for separating said tape cassettes;
    support members slidably mounted on said partition plates of said tape cassette holder for determining the position of said tape cassettes when said tape cassette holder is loaded into said tape cassette holder storing member; and
    positioning means provided on said tape cassette holder storing member of said main body on a wall portion opposite said entrance opening of said storing member, for positioning said tape cassettes at a predetermined position by direct contact of said support members with said positioning means.

2. The tape cassette loading device of claim 1, wherein at least two tape cassettes are stored in said tape cassette holder loaded onto a single capstan, and said positioning means together with said support members accurately position said tape cassettes starting with the tape cassette first removed from a bearing portion of a single capstan on which said tape cassette holder is loaded.

3. The tape cassette loading device of claim 1, wherein at least two tape cassettes are stored in said cassette holder, and said positioning means comprises positioning means for positioning a first tape cassette in a vertical direction and a horizontal direction, means for positioning a second cassette in the vertical direction, and positioning means and support members provided for positioning a second tape cassette in a horizontal direction.

4. The tape cassette loading device of claim 3, wherein said first tape cassette is loaded near a bearing portion of a capstan on which said tape cassette holder is loaded.

5. The tape cassette loading device of claim 3, wherein said means for positioning said first tape cassette in horizontal and vertical directions and said second tape cassette in a vertical direction is provided with the holder storing member of said tape cassette apparatus.

6. A tape recorder comprising:
    a main unit for driving at least one tape cassette; and
    a tape cassette loading device which can store and accurately position a plurality of tape cassettes in the main body of a tape cassette recorder and/or reproducing apparatus comprising:
    a tape cassette holder storing member portion of a main body of a tape cassette recorder and/or reproducing apparatus having an entrance opening for the introduction of and storing a tape cassette holder;
    a tape cassette holder for storing a plurality of tape cassettes provided with partition plates for separating said tape cassettes;
    support members slidably mounted on said partition plates of said tape cassette holder for determining the position of said tape cassettes when said tape cassette holder is loaded into said tape cassette holder storing member; and
    positioning means provided on said tape cassette holder storing member of said main body on a wall portion opposite said entrance opening of said storing member, for positioning said tape cassettes at a predetermined position by direct contact of said support members with said positioning means.

7. The tape recorder of claim 1, inclusive of said tape cassette loading device, wherein at least two tape cassettes are stored in said cassette holder, and said positioning means comprises positioning means for positioning a first tape cassette in a vertical direction and a horizontal direction, means for positioning a second cassette in a vertical direction, and positioning means and support members for positioning a second tape cassette in a horizontal direction.

8. The tape recorder of claim 7, inclusive of said tape cassette loading device wherein said first tape cassette is loaded near a bearing portion of a capstan on which said tape cassette holder is loaded.

9. The tape recorder of claim 7, inclusive of said tape cassette loading device, wherein said means for positioning said first tape cassette in horizontal and vertical directions and said second tape cassette in a vertical direction is provided with the holder storing member of said tape cassette apparatus.

* * * * *